(12) United States Patent
Ikeda

(10) Patent No.: US 8,076,579 B2
(45) Date of Patent: Dec. 13, 2011

(54) WATERTIGHT STRUCTURE FOR SPLICED PORTION

(75) Inventor: Takayoshi Ikeda, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 318 days.

(21) Appl. No.: 12/520,921

(22) PCT Filed: Jun. 11, 2007

(86) PCT No.: PCT/JP2007/061707
§ 371 (c)(1),
(2), (4) Date: Aug. 25, 2009

(87) PCT Pub. No.: WO2008/081612
PCT Pub. Date: Jul. 10, 2008

(65) Prior Publication Data
US 2010/0018767 A1    Jan. 28, 2010

(30) Foreign Application Priority Data
Dec. 28, 2006 (JP) ................. 2006-356029

(51) Int. Cl.
*H02G 3/06* (2006.01)
(52) U.S. Cl. .................. 174/72 C; 174/74 R; 174/84 R; 174/75 R; 174/87
(58) Field of Classification Search ............... 174/72 C, 174/74 R, 84 R, 84 C, 87, 88 R, 75 R; 439/783; 403/314
See application file for complete search history.

(56) References Cited

U.S. PATENT DOCUMENTS

| 7,049,520 | B1 * | 5/2006 | Tamm et al. | 174/84 C |
| 7,282,644 | B1 * | 10/2007 | Alvey | 174/84 R |
| 7,402,751 | B2 * | 7/2008 | Haberman | 174/84 R |
| 7,658,655 | B2 * | 2/2010 | Waltz | 439/784 |
| 2002/0062975 | A1 | 5/2002 | Matsunaga | |
| 2006/0048965 | A1 | 3/2006 | Ootsuki | |

FOREIGN PATENT DOCUMENTS

| JP | 58-22042 | 2/1983 |
| JP | 5-190242 | 7/1993 |
| JP | 7-184308 | 7/1995 |

OTHER PUBLICATIONS

English language Abstract of JP 5-190242, Jul. 30, 1993.
English language Abstract of JP 7-184308, Jul. 21, 1995.

* cited by examiner

*Primary Examiner* — Dhirubhai R Patel
(74) *Attorney, Agent, or Firm* — Greenblum & Bernstein P.L.C.

(57) ABSTRACT

A watertight structure for a spliced portion includes a container that has an open top adapted to receive a spliced portion of electrical wires and that is elongated in a longitudinal direction of the electrical wires, and a lid to be mounted on the container. The container is provided with a bottom wall and upward inclined portions that extend in a longitudinal direction. The container is provided with a spliced portion positioning section having a narrow width. The spliced portion positioning section is provided on opposite outer sides with receiving portions to be engaged with locking pieces projecting from the lid.

2 Claims, 5 Drawing Sheets

Prior Art

WATERTIGHT STRUCTURE FOR SPLICED PORTION

FIELD OF THE INVENTION

This invention relates to a watertight structure for a spliced portion, and more particularly relates to a structure in which a watertight agent is surely filled around spliced portion on wire harnesses to be arranged in a motor vehicle so as to perform a waterproofing function.

BACKGROUND OF THE INVENTION

Before, in the case where a plurality of electrical wires in wire harnesses to be arranged in a motor vehicle are connected to one another, insulation sheaths of the electrical wires are stripped to expose core conductors, the exposed core conductors are connected to one another by means of welding, soldering, or crimping by crimping terminals to form a spliced portion. Since the core conductors or crimping terminals will be eroded if water adheres to the spliced portion, wire harnesses to be arranged in an engine compartment in a motor vehicle, which is a water-receiving area, have spliced portions with a waterproofing function.

The present applicant has disclosed a waterproofing process in JP HEI 7(1995)-184308 A (Patent Document 1). FIGS. 5A and 5B show a watertight structure 1 for a spliced portion on electrical wires in Patent Document 1. FIG. 5A is a perspective view of a prior art resin mold for producing a prior art watertight structure for a spliced portion. FIG. 5B is a longitudinal section view of the prior art watertight structure for the spliced portion.

In the watertight structure 1, core conductors a and b are exposed from electrical wires W1 and W2 constituting wire harnesses, a spliced portion 2 that is formed by crimping the exposed core conductors a and b by crimping terminals is inserted into a resin mold 3, and a watertight agent 4 is filled in the resin mold 3.

The resin mold 3 is formed into a box-like configuration elongated longitudinally and having an open top. A bottom wall 3*a* of the resin mold 3 is provided on longitudinal opposite side ends with side walls 3*b*-1 and 3*b*-2 for receiving the electrical wires W1 and W2 and on opposite lateral sides with side walls 3*c*. One side wall 3*b*-1 is provided in an upper end with a single electrical wire threading groove 3*d*-1 that corresponds to a size of the electrical wire W1 while the other side wall 3*b*-2 is provided in an upper end with two electrical wire threading grooves 3*d*-2 and 3*d*-3 that correspond to sizes of the electrical wires W1 and W2. The sizes of the respective electrical wire threading grooves 3*d*-1 to 3*d*-3 are set to be dimensions in which the respective electrical wires W1 and W2 are fitted closely in the respective grooves.

Patent Document 1: JP HEI 7(1995)-184308 A

SUMMARY OF THE INVENTION

Problems to be Solved by the Invention

Since the resin mold for waterproofing disclosed in Patent Document 1 closely fits the electrical wires in the electrical wire threading grooves, it is necessary to prepare the electrical wire threading grooves that have the same sizes and numbers as those of the electrical wires. Consequently, there is a problem that various kinds of resin molds must be prepared in accordance with the sizes and numbers of the electrical wires to be spliced.

Although insulation sheaths of the electrical wires are held in the electrical wire threading grooves, the spliced portion is floated in the resin mold. There is also another problem that the spliced portion further floats upward in the resin mold and a resin is difficult to flow onto the upper part of the spliced portion, whereby a sufficient waterproofing function cannot be accomplished, if a resin is filled into the resin mold while the spliced portion is floated.

In view of the above problems, an object of the present invention is to provide a watertight structure for a spliced portion on electrical wires in which the container can be used regardless of sizes and numbers of the electrical wires to be spliced so long as the spliced portion on the electrical wires can be accommodated in a container, and a suitable amount of a watertight agent can perform a waterproofing function.

Means for Solving the Problems

In order to achieve the above object, a watertight structure for a spliced portion in accordance with the present invention includes a container that has an open top adapted to receive a spliced portion of electrical wires and that is elongated in a longitudinal direction of the electrical wires, and a lid to be mounted on the container. The container is provided with a bottom wall including a central flat portion at a deepest position in the container and upward inclined portions that extend from opposite sides of the central flat portion in a longitudinal direction. The central flat portion is provided with a spliced portion positioning section having a narrow width. The spliced portion positioning section is provided on opposite outer sides with receiving portions to be engaged with locking pieces projecting from opposite sides of the lid. The lid is provided on a middle part in the longitudinal direction with a narrow width portion adapted to be fitted in the spliced portion positioning section. Wide width portions at opposite sides of the narrow width portion in the longitudinal direction are formed into configurations adapted to be fitted in spaces at opposite sides of the spliced portion positioning section of the container in the longitudinal direction. The spliced portion of the electrical wires is fitted and held in the spliced portion positioning section in the container. The spliced portion is embedded in a watertight agent. The lid closes the embedded part to secure the spliced portion to the container.

As described above, in the present invention, the electrical wires are disposed in the elongated container in the longitudinal direction. The spliced portion of the electrical wires is fitted and held in the spliced portion positioning section of the container and is embedded in the watertight agent to perform a waterproofing function. Consequently, it is possible to waterproof the spliced portion of the electrical wires regardless of sizes and numbers of the electrical wires to be spliced, so long as the spliced portion has a dimension to be contained in the spliced portion positioning section. Accordingly, it is not necessary to prepare various kinds of containers in accordance with the sizes and numbers of the electrical wires to be spliced.

Also, since the lid closes the embedded spliced portion, it is possible to prevent the spliced portion from being moved upward and to cause the watertight agent to be flowed above the spliced portion, thereby surely embedding the spliced portion in the watertight agent and effecting the waterproofing function.

In addition, since the spliced portion is not moved upward, it is possible to fill a space above the spliced portion with a small amount of the watertight agent.

In more detail, the container is formed into a boat-like configuration. The spliced portion positioning section is provided with a pair of opposed projections that protrude inward from opposed side walls in a width direction perpendicular to the longitudinal direction. Each of the projections is provided on a top with a receiving aperture. The lid is provided on opposite sides of the narrow width portion in the width direction with guide walls adapted to be arranged along inner surfaces of the projections of the container. Each of the guide walls is provided with a locking piece bent outward and downward from an upper end of each guide wall. Each locking piece is provided on a lower end with a locking pawl adapted to be inserted and fitted in each receiving aperture.

According to the above construction, since a space between the opposed projections protruding inward from the opposed side walls of the container defines the spliced portion positioning section and the size of the spliced portion is formed in accordance with the size of the spliced portion positioning section, the spliced portion positioning section can hold the spliced portion.

Also, since the projections protrude from the opposed side walls of the container and the spliced portion positioning section is the narrow width, it is possible to reduce an amount of the watertight agent to be filled in the container.

Furthermore, since the locking pieces of the lid are engaged with the receiving apertures in the top of the projections, the lid can be disposed on the upper part of the spliced portion and the spliced portion is not moved upward by the lid during filling the watertight agent, thereby surely embedding the spliced portion in the watertight agent.

Effects of the Invention

As describe above, according to the watertight structure for the spliced portion in accordance with the present invention, the electrical wires are disposed in the elongated container in the longitudinal direction. The spliced portion of the electrical wires is fitted and held in the spliced portion positioning section of the container and is embedded in the watertight agent to perform a water-tightening function. Consequently, it is possible to waterproof the spliced portion of the electrical wires regardless of sizes and numbers of the electrical wires to be spliced, so long as the spliced portion has a dimension sized to be contained in the spliced portion positioning section.

Figure 1:
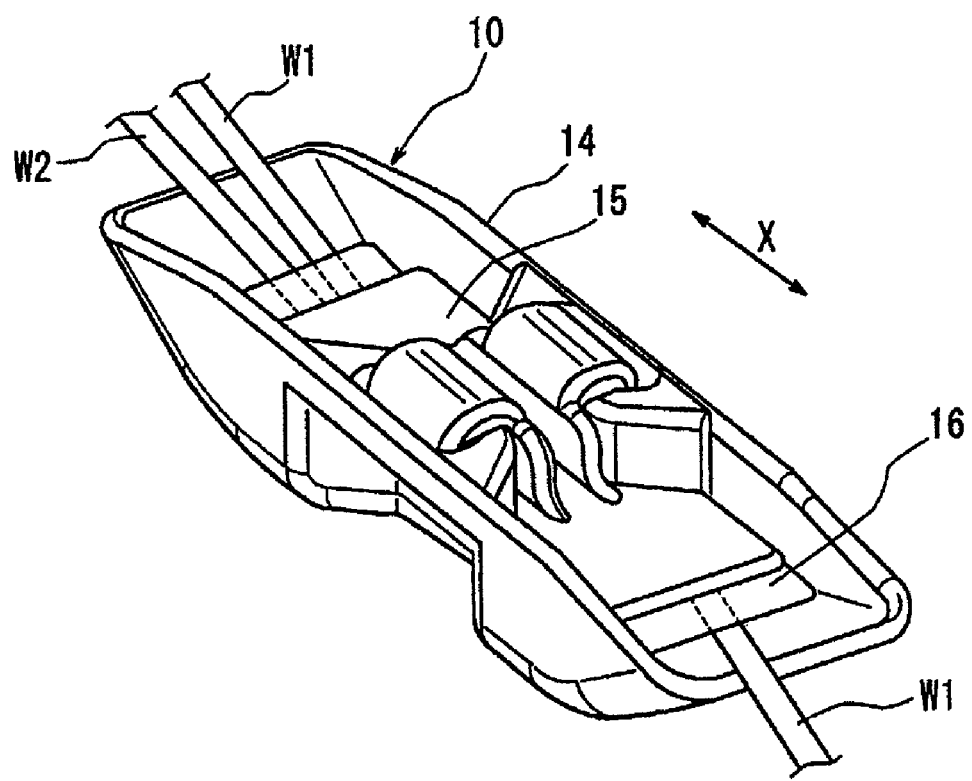
FIG. 1 is a perspective view of a first embodiment of a watertight structure for a spliced portion in accordance with the present invention.

EXPLANATION OF SIGNS 10 watertight structure for a spliced portion
13 spliced portion
14 container
14a bottom wall
14c spliced portion positioning section
14e projections
14f receiving aperture
15 lid
15a narrow width portion
15b wide width portion
15c guide walls
15d locking pieces
15e locking pawls
16 watertight agent
W1, W2 electrical wires

DETAILED DESCRIPTION OF THE INVENTION

Referring now to the drawings, embodiments of a watertight structure for a spliced portion in accordance with the present invention will be described below.

FIGS. 1 through 4C show a first embodiment of the watertight structure for the spliced portion of the present invention.

Insulation sheaths 11 of electrical wires W1 and W2 are stripped at given intermediate parts in a longitudinal direction to expose core conductors 12. The exposed core conductors 12 are bonded by means of ultrasonic welding to form a spliced portion 13. The spliced portion 13 is inserted into a container 14 so that the spliced portion 13 is immersed in a watertight agent 16 filled in the container 16. Then, a lid 15 is mounted on the container 16 to seal an interior of the container 16. Thus, a watertight structure 10 for the spliced portion 13 is formed.

Figure 2A:
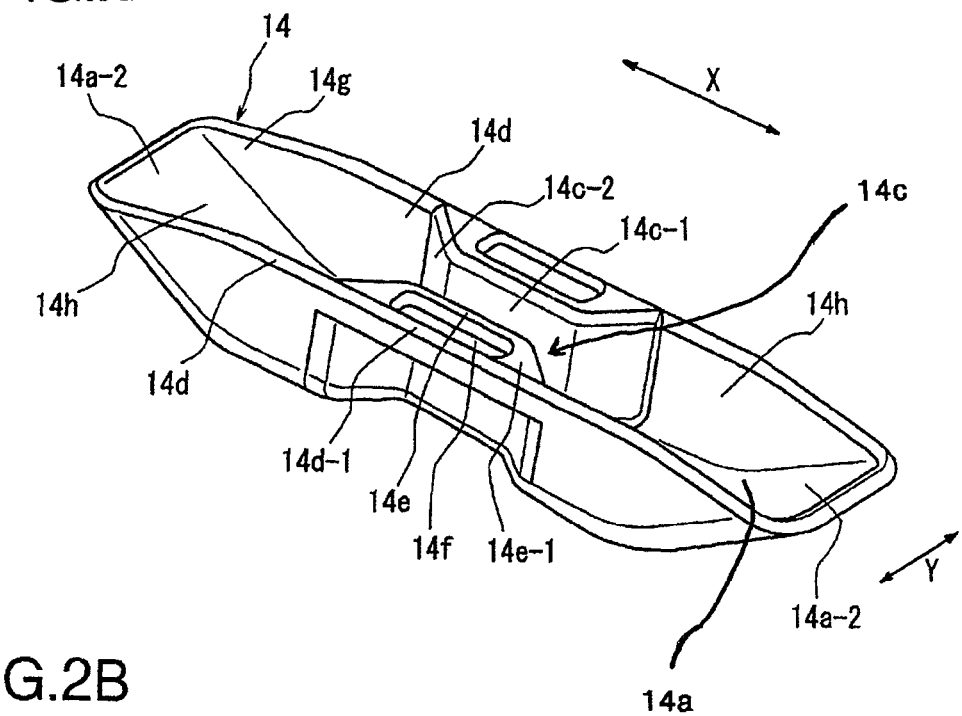
FIG. 2A is a perspective view of a container.

The container 14 is made of an injection molding product and, as shown in FIG. 2A, is formed into a generally boat-like configuration that extends in a longitudinal direction X of the electrical wires W1 and W2. The container 14 includes a bottom wall 14a and opposed side walls 14d at a width direction Y perpendicular to the longitudinal direction X. The container 14 is opened at an upper part to define an open top 14g. The bottom wall 14a is provided with opposite side walls 14a-2 that incline upward from a middle part 14a-1 of the bottom wall 14a in the longitudinal direction X. The middle part 14a-1 of the bottom wall 14a is provided with a spliced portion positioning section 14c.

The spliced portion positioning section 14c is defined by a space surrounded by a pair of projections 14e and a middle part 14a-1 that is deep and narrow between the projections 14e. Each projection 14e protrudes inward in a trapezoidal form so that middle parts of the projections 14e in the longitudinal direction X approach toward each other at upper and lower ends of the opposed side walls 14d.

Since the projections 14e provided on the opposed side walls 14d have upper ends at the opposed side walls 14d, trapezoidal recesses are defined in lower parts of upper end frames 14d-1 at outer sides of the opposed side walls 14d.

Each trapezoidal projection 14e is provided on an upper end with a trapezoidal upper surface portion 14e-1 contiguous with the upper end frame 14d-1 of the side wall 14d. Each trapezoidal upper surface portion 14e-1 is provided with a receiving aperture 14f that is opened toward the recessed space. The receiving aperture 14f serves to lock the lid 15.

Thus, the spliced portion positioning section 14c is disposed between the pair of trapezoidal projections 14e to define a narrow space 14c-1 at a central part and gradually enlarging spaces 14c-2 at opposite sides. The spliced portion positioning section 14c is provided in opposed upper sides with lid receiving apertures 14f. The longitudinally opposite sides of the spliced portion positioning section 14c are contiguous with the space 14c-2 and include opposite side portions 14a-2 of the bottom wall 14a that become shallow gradually and insulation sheathed electrical wire containing portions 14*h* between the opposed side walls 14*d*.

The lid 15 is also made of an injection molding product and is shaped so that the lid can be mounted downward onto the spliced portion positioning section 14*c* of the container 14.

Figure 2B:
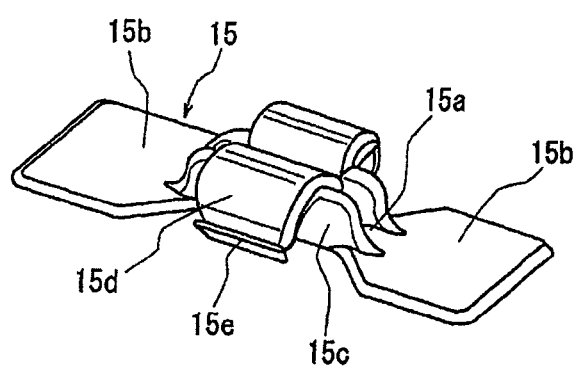
FIG. 2B is a perspective view of a lid.
Figure 3:
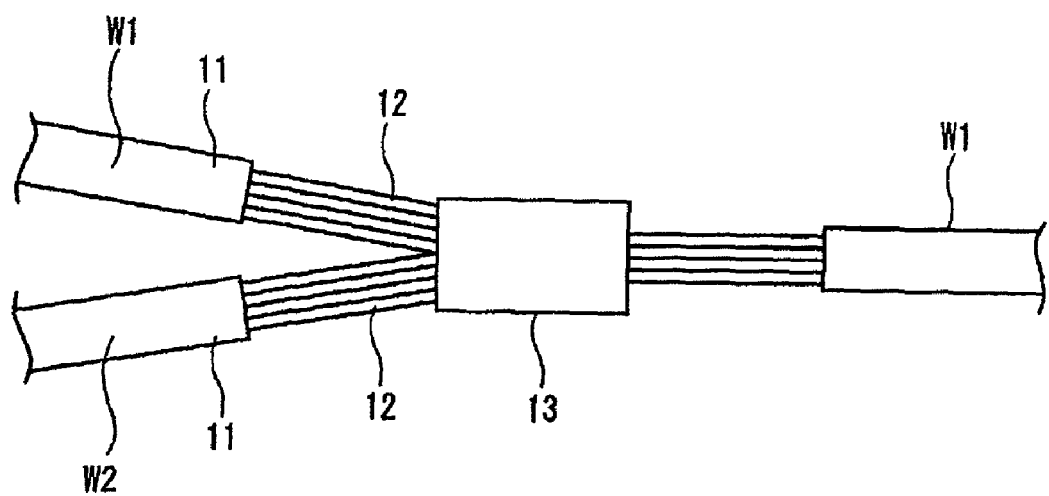
FIG. 3 is a plan view of electrical wires, illustrating a spliced portion of the wires.

That is, as shown in FIG. 2B, the lid 15 includes a central narrow flat plate-like portion 15*a* adapted to be fitted in the spliced portion positioning section 14*c* of the container 14, and wide flat plate-like portions 15*b* at opposite sides in the longitudinal direction.

The narrow portion 15*a* is provided on opposite sides in a width direction with each guide wall 15*c*. The guide wall 15*c* is provided on an upper end with a locking piece 15*d* bent outward and downward, and the locking piece 15*d* is provided on a lower end with a locking pawl 15*e*.

When the guide walls 15*c* of the lid 15 are slid along inner surfaces of the projections 14*e* on the container 14 and are fitted into the spliced portion positioning section 14*c*, the locking pieces 15*d* on the lid 15 are inserted into the receiving apertures 14*f* in the upper side portions 14*e*-1 of the container 14 and the locking pawls 15*e* at lower ends of the locking pieces 15*d* engage with lower surfaces of the upper side portions 14*e*-1.

The watertight agent 16 is made of an epoxy resin.

The watertight agent is not limited to the epoxy resin and may be made of polypropylene, polyamide, or the like. Also, two-liquid mixed adhesive (urethane or the like) or one-liquid adhesive (silicone RTV or the like) may be used as the watertight agent 16.

Next, a process for waterproofing the spliced portion 13 will be described below.

Figure 4A:
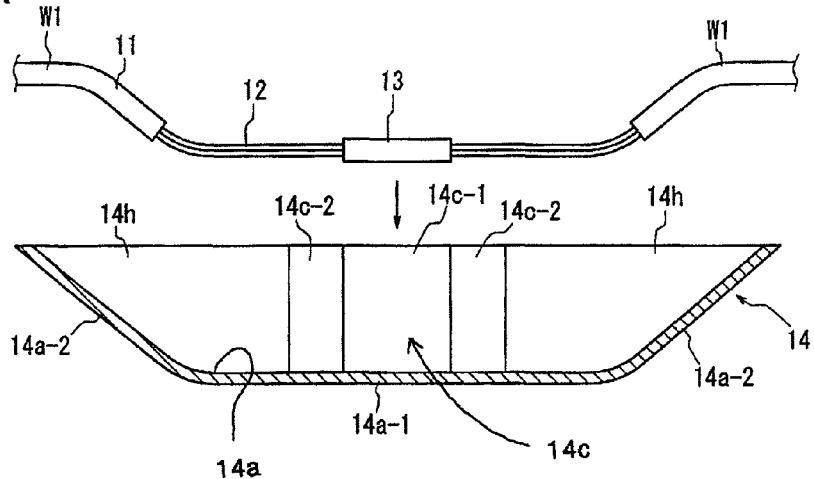
FIGS. 4A to 4C are explanatory views of a watertight process of the present invention.

Firstly, as shown in FIG. 4A, the electrical wires W1 and W2 are inserted through the open top 14*g* into the container 14, the spliced portion 13 of the electrical wires W1 and W2 and exposed core conductors 12 at the opposite ends of the spliced portion 13 are pushed into the deepest, narrow space 14*c*-1 in the spliced portion positioning section 13 of the container 14, and the electrical wires W1 and W2 covered with insulation sheaths 11 and contiguous with the opposite ends of the spliced portion 13 are inserted through gradually enlarging space 14*c*-2 into the electrical wire containing portions 14*h*. At this time, since the electrical wire containing portions 14*h* become gradually shallow, the electrical wires W1 and W2 are inserted into the container 14 so that the spliced portion 13 is disposed at the lowest position in the container 14 and the opposite ends of the wires are gradually displaced upward.

Figure 4B:
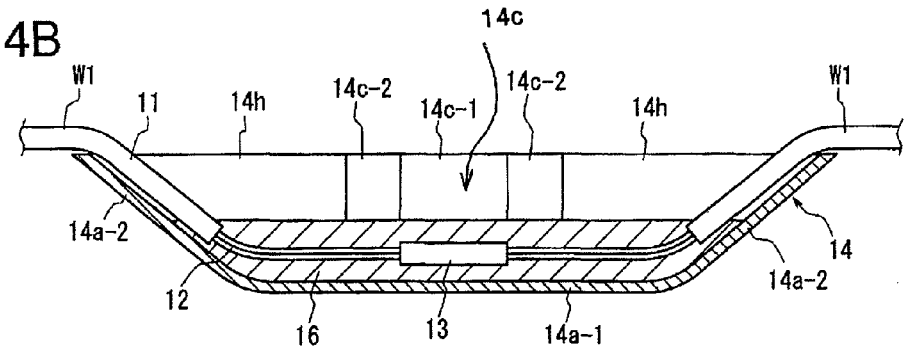

Secondly, as shown in FIG. 4B, the watertight agent 16 is filled in the container 14. The spliced portion 13, exposed core conductors 12 at the opposite end of the spliced portion 13, and distal ends of the electrical wires W1 and W2 covered with insulation sheaths 11 at the opposite exposed core conductors 12 are immersed in the watertight agent 16.

Figure 4C:
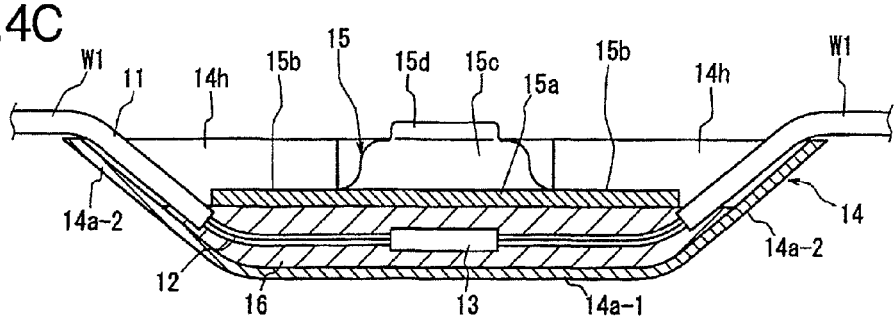
Figure 5A:
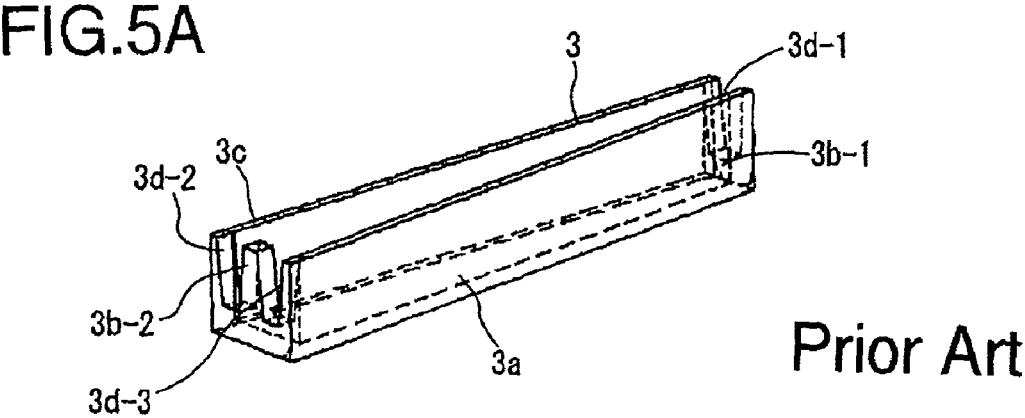
FIG. 5A is a perspective view of a prior art resin mold for producing a prior art watertight structure for a spliced portion.
Figure 5B:
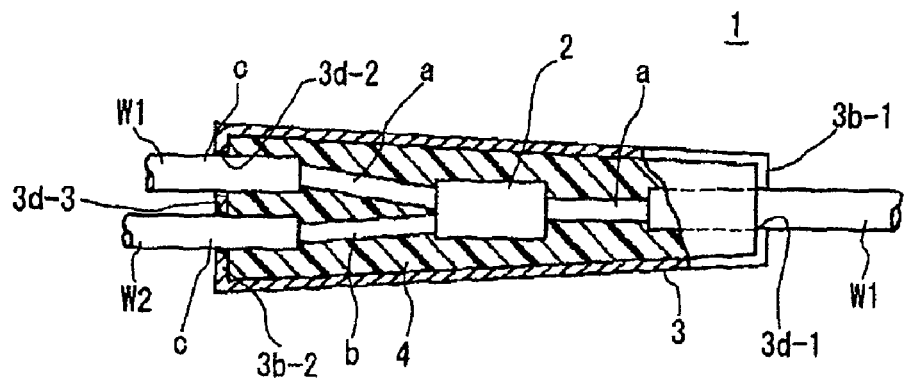
FIG. 5B is a longitudinal section view of the prior art watertight structure for the spliced portion.

Thirdly, as shown in FIG. 4C, the lid 15 is mounted on the container 14, the guide walls 15*c* at the opposite sides of the lid 15 are pushed down along the inner surfaces of the projections 14*e* on the container 14, the spliced portion 13, exposed core conductors 12, and watertight agent 16 are pushed down into the narrow width portion 15*a* between the lower ends of the guide walls 15*c*. These operations enable the watertight agent 16 to be perfectly flowed into a space among the spliced portion 13, exposed core conductors 12, and bottom wall 14*a* of the container 14, thereby eliminating any clearance that is not filled with the watertight agent 16.

Similarly, the opposite wide width portions 15*b* of the lid 15 are fitted in the electrical wire containing portions 14*h*, push the watertight agent 16 and the electrical wires W1 and W2 accommodated in the electrical wire containing portions 14*h* and covered with the insulation sheaths 11, and cause the watertight agent 16 to be positively flowed into a space between the electrical wires W1 and W2, thereby eliminating any clearance that is not filled with the watertight agent 16.

Since each of the electrical wire containing portions 14 is provided with the bottom wall that is gradually inclined upward to gradually form a shallow depth, when the wide width portions 15*b* of the lid 15 cover the portions 14*h*, the distal ends of the electrical wires W1 and W2 covered with the insulation sheaths 11 and inserted into the portions 14*h* can be immersed in a small amount of watertight agent 16.

As described above, the lid 15 is mounted on the electrical wire containing portions 14*h* so that the watertight agent 16 is filled in the container 14 without causing any clearances, the lower parts of the locking pieces 15*d* of the lid 15 are inserted into the receiving apertures 14*f* in the container 14, the locking pawls 15*e* at the lower ends engage the lower surfaces of the upper side portions 14*e*-1, and the lid 15 is secured to the container 14. Thus, it is possible to prevent the pushed lid 15 from being moved upward.

Under this condition, the container 14 is heated at 70 (degrees in centigrade) to harden the watertight agent 16, and the spliced portion 13 of the electrical wires W1 and W2, exposed core conductors 12 at the opposite ends of the spliced portion 13, and the electrical wires W1 and W2 covered with the insulation sheaths 11 are embedded in the hardened watertight agent 16.

In the above watertight structure for the spliced portion in accordance with the present invention, the spliced portion 13 of the electrical wires W1 and W2 is constrained from moving in a width direction between the opposed projections 14*e* in the spliced portion positioning section 14*c* and from moving in a vertical direction between the container bottom wall 14*a* and the lid 15, thereby precisely holding and containing the spliced portion 13 in the container 14. Since the spliced positioning section 14*c* is arranged on the deepest part in the container 14, it is possible to surely embed the spliced portion 13 and opposite exposed core conductors 12 in the watertight agent 16.

Furthermore, since the lid 15 pushes the watertight agent 16, it is possible to fill the watertight agent 16 in the clearance among the spliced portion 13, exposed core conductors 12, distal ends of electrical wires WI and W2 covered with the insulation sheaths 11 and contiguous with the exposed core conductors 12, thereby enhancing a waterproofing function.

Since the lid 15 presses the watertight agent 16 and the container 14 is formed into the boar-like configuration, it is possible to surely embed the spliced portion 13 in even a small amount of the watertight agent.

The container 14 and lid 15 are shareable in use, so long as the spliced portion 13 has a size adequate to be inserted into a space between the spliced portion positioning section 14*c* and the narrow portion 15*a* of the lid 15 regardless of the numbers and diameters of the electrical wires to be spliced. Further, since the container 14 is formed into the boat-like configuration, it is possible for the container to prevent the watertight agent 16 from being leaked outside.

The invention claimed is:

1. A watertight structure for a spliced portion including a container that has an open top adapted to receive a spliced portion of electrical wires and that is elongated in a longitudinal direction of the electrical wires, and a lid to be mounted on said container;

wherein said container is provided with a bottom wall and upward inclined portions that extend from opposite sides of said bottom wall in a longitudinal direction, said bottom wall is provided with a spliced portion positioning section having a narrow width, said spliced portion positioning section is provided on opposite outer sides with receiving portions to be engaged with locking pieces projecting from said lid;

wherein said lid is provided on a middle part in the longitudinal direction with a narrow width portion adapted to be fitted in said spliced portion positioning section, wide width portions at opposite sides of said narrow width portion in the longitudinal direction are formed into configurations adapted to be fitted in spaces at opposite sides of said spliced portion positioning section of said container in the longitudinal direction; and wherein said spliced portion of said electrical wires is fitted and held in said spliced portion positioning section in said container, said spliced portion is embedded in a watertight agent, and said lid closes the embedded spliced portion to secure said spliced portion to said container.

2. A watertight structure for a spliced portion according to claim 1, wherein said container is formed into a boat-like configuration, said spliced portion positioning section is provided with a pair of opposed projections that protrude inward from opposed side walls in a width direction perpendicular to the longitudinal direction, and each of said projections is provided on a top with a receiving aperture; and wherein said lid is provided on opposite sides of said narrow width portion in the width direction with guide walls adapted to be arranged along inner surfaces of said projections of said container, each of said guide walls is provided with a locking piece bent outward and downward from an upper end of each guide wall, and said each locking piece is provided on a lower end with a locking pawl adapted to be inserted and fitted in said each receiving aperture.

* * * * *